Oct. 12, 1965 M. K. FOSS 3,211,430
MIXING APPARATUS
Filed May 10, 1963 4 Sheets-Sheet 1
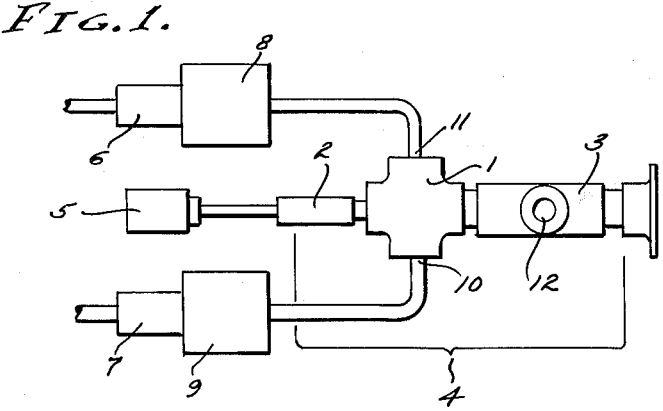
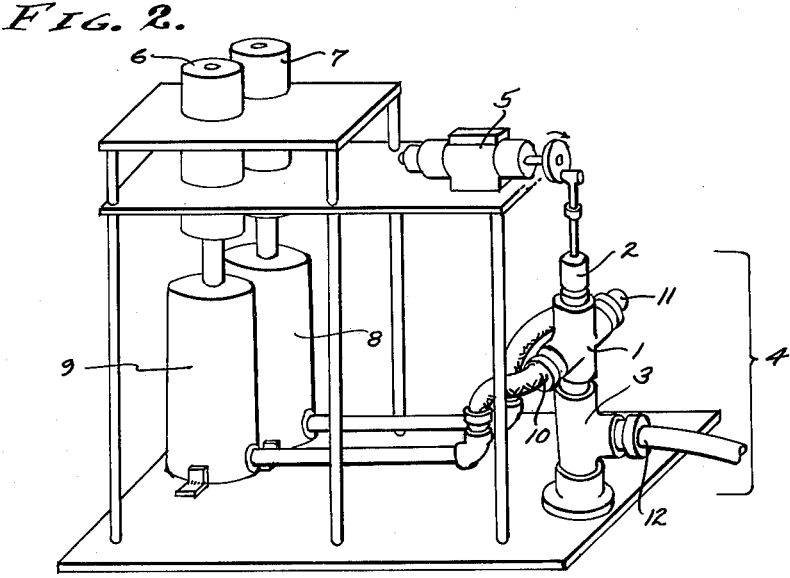
INVENTOR.
MILTON K. FOSS

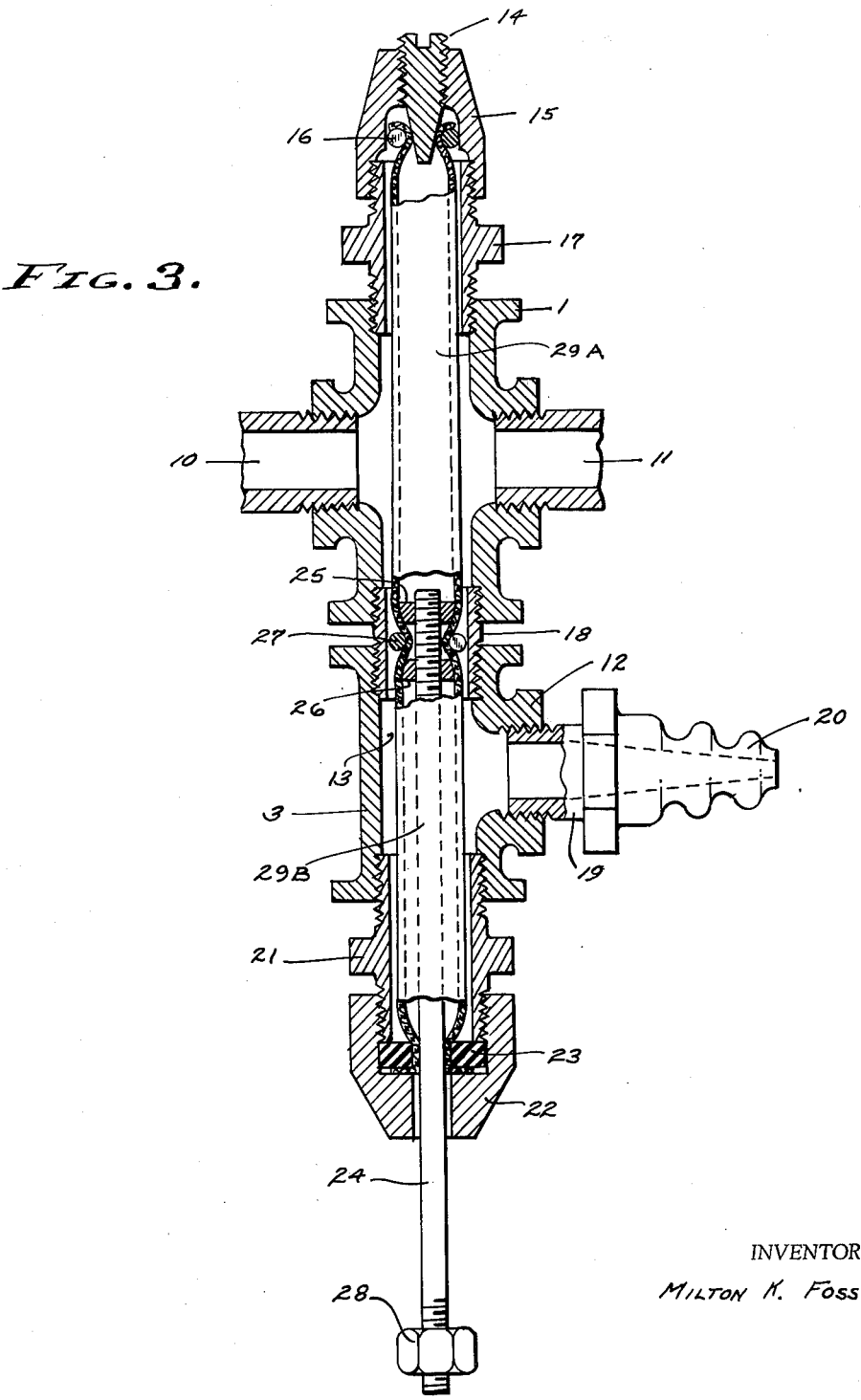

Oct. 12, 1965  M. K. FOSS  3,211,430
MIXING APPARATUS

Filed May 10, 1963  4 Sheets-Sheet 3

INVENTOR.
MILTON K. FOSS

Oct. 12, 1965   M. K. FOSS   3,211,430
MIXING APPARATUS

Filed May 10, 1963   4 Sheets-Sheet 4

INVENTOR.
MILTON K. FOSS

United States Patent Office 3,211,430
Patented Oct. 12, 1965

3,211,430
MIXING APPARATUS
Milton K. Foss, 22631 Draille Drive, Torrance, Calif.
Filed May 10, 1963, Ser. No. 279,535
8 Claims. (Cl. 259—4)

This invention relates to a new and useful mixing apparatus and means for simultaneously mixing and advancing two or more viscous fluids or pastes, and more particularly to apparatus for mixing thixotropic reactive compounds and dispensing them ready for use.

An object of the invention is to provide new and improved mixing apparatus for simultaneously mixing two or more viscous liquids or pastes.

Another object of the invention is to provide new and improved mixing apparatus for dispensing two or more combined liquids or pastes simultaneously during the mixing operation. Other and further objects will become apparent as the description proceeds.

An apparatus illustrating certain features of the invention may includes a cylinder having a configurated bore therein, and a tubular woven mesh constricted at its center and firmly attached to one end within the cylinder, and the other end of the tubular mesh suitably mounted within the cylinder to provide a reciprocating movement to the tubular mesh, when actuated by an electric motor or like power source.

A complete understanding of the invention may be obtained from the following detailed description of apparatus forming specific embodiments thereof, when read in conjunction with the following drawings, in which FIG. 1 is a schematic lay-out of a set-up embodying the invention.

FIG. 2 is a prespective view of an apparatus forming an embodiment of the invention.

FIG. 3 is a vertical longitudinal section of an apparatus forming an embodiment of the invention.

Figure 4:
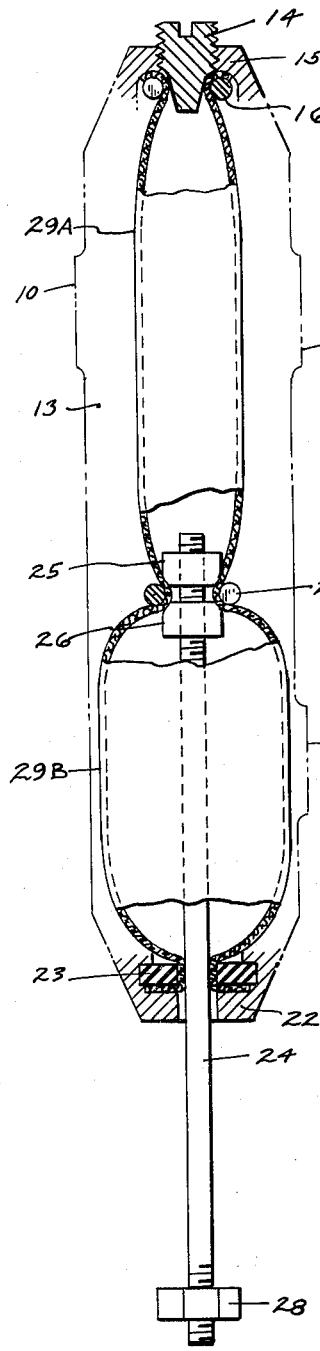
FIG. 4 is an illustration of an embodiment of the invention, showing the centrally constricted tubular mesh component under tension in the upper section and under compression in the lower section.

Referring now in detail to the drawings, there is shown in FIG. 1 a schematic layout in which a four-way element or T 1 is combined with element 2 and a three-way element or T 3, to form a cylinder 4, within which a centrally constricted tubular mesh unit 29A and 29B, shown in FIGS. 3, 4, 5, and 6 is situated. The tubular mesh unit is reciprocatively actuated by a motor 5. Pressure pumps 6 and 7 provide pressure into material containers 8 and 9, forcing the uncombined materials separately into inlets 10 and 11 of the cylinder 4, and into the reciprocating tubular mesh unit within said cylinder, and advancing the combined or mixed material through the cylinder outlet 12.

FIG. 2 illustrates with similar identifying numerals a proposed hook-up of the elements as described in FIG. 1.

In FIG. 3 a series of commercial or specifically machined elements are combined to form a configurated cylindrical cavity 13, and may comprise a wedge plug 14 for the purpose of firmly retaining the end of a centrally constricted tubular mesh unit 29A and 29B, a plug cap 15 enclosing a retaining ring 16 for securely holding the end of the tubular mesh section 29A, a connector 17 joining with a four-way T 1 to provide a continuation of the cylindrical cavity 13. Two opposed openings of the four-way T 1, are suitably connected to material inlets 10 and 11, the material entering under pressure from the tanks 8 and 9, see FIG. 2. A further connector 18 serves a dual purpose by providing a configuration or partial restriction to the cavity 13, and connecting to a three-way T 3. This T 3 provides a further continuation of the cylindrical cavity 13, and provides for the mixed material outlet 12, and this may be suitably extended by connector 19 to a nozzle 20. The lower end of the T 3, is joined by a connector 21 to a bored plug-cap 22, enclosing a packing gland 23 and slidably retaining the lower end of the tubular mesh section 29B upon an actuating rod 24.

At the mid section of the tubular mesh 29A and 29B two threaded collars 25 and 26, situated within the mesh and threaded upon the actuating rod 24, firmly retain, constrict and divide into two sections 29A and 29B the tubular mesh when locked on by the retainer ring 27.

The free end 28 of the actuating rod 24 may be suitably attached to a source of power 5, see FIG. 2, to provide a reciprocating up and down motion to the rod 24.

Figure 5:
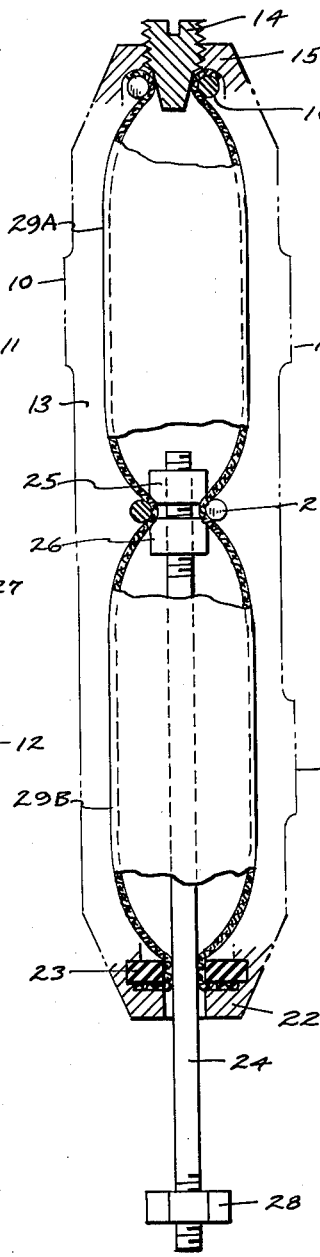
FIG. 5 is an illustration of an embodiment of the invention, showing the centrally constricted tubular mesh component at the point of equilibrium in both sections.
Figure 6:
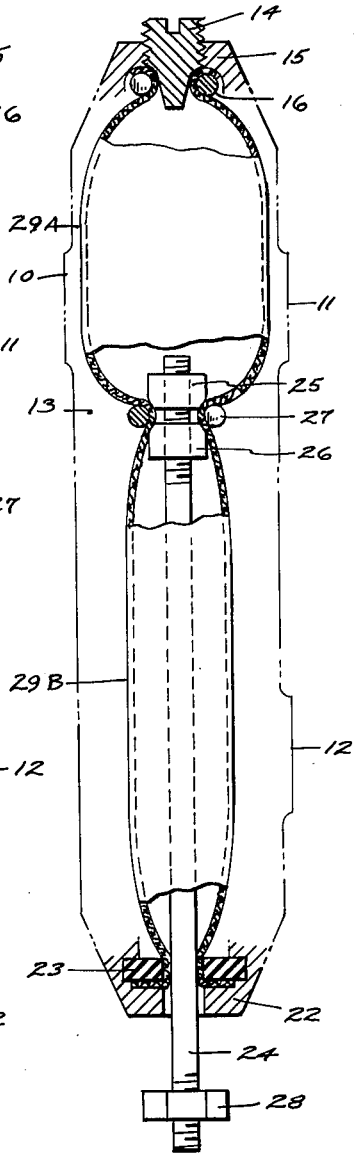
FIG. 6 is an illustration of an embodiment of the invention, showing the centrally constricted tubular mesh component under compression in the upper section and under tension in the lower section.

In FIGS. 4, 5 and 6, the cylindrical cavity 13 is outlined, and encloses a tubular mesh constricted into two sections 29A and 29B. The section 29B is firmly attached to the threaded rod 24 by means of an exterior locking ring 27, confined between two threaded collars 25 and 26 situated within the tubular mesh 29A and 29B, and threaded upon the actuating rod 24.

The tubular mesh section 29A is firmly retained at its end by means of the elements 14, 15 and 16, see FIG. 3.

The tubular mesh section 29B is slidably engaged over the actuating rod 24, by means of the bored cap 22, and the packing gland 23, see FIG. 3.

Inlets 10 and 11 and the outlet 12 which are clearly shown in FIG. 3, are indicated by phantom lines in FIGS. 4, 5 and 6.

When the actuating rod 24 is supplied with an up and down motion the tubular mesh sections 29A and 29B undergo the following movements:

On the down stroke the section 29A, see FIG. 4, becomes extended and elongated, and the section 29B becomes compressed and rounded on the neutral or intermediate position of the movement, see FIG. 5, both sections 29A and 29B are in the position of no strain. On the up stroke, see FIG. 6, the section 29A is compressed and rounded, and the section 29B is extended and elongated; the reverse to the condition existing in FIG. 4.

Figure 7:
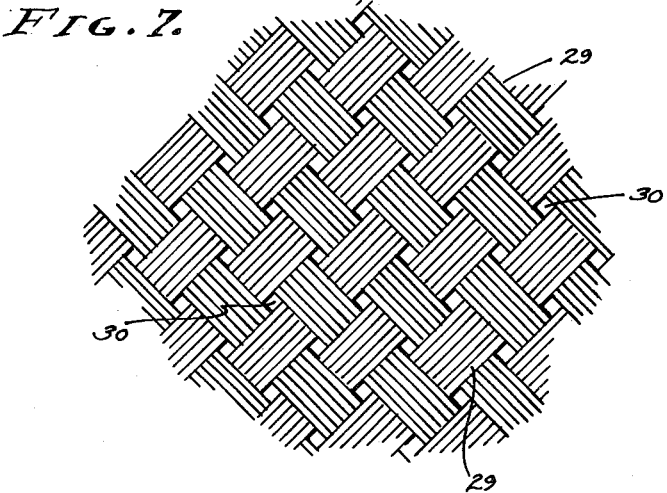
FIG. 7 is a fragmentary illustration of a multi-strand mesh or grid.

In FIG. 7 is a planar illusration of a preferred multi-strand mesh or grid, wherein the strands 29, are woven in a manner; for example, a basket weave, whereby apertures or holes are regularly spaced throughout the design, as illustrated. I do not wish however, to limit this invention to the particular design of woven mesh illustrated herein.

Figure 8:
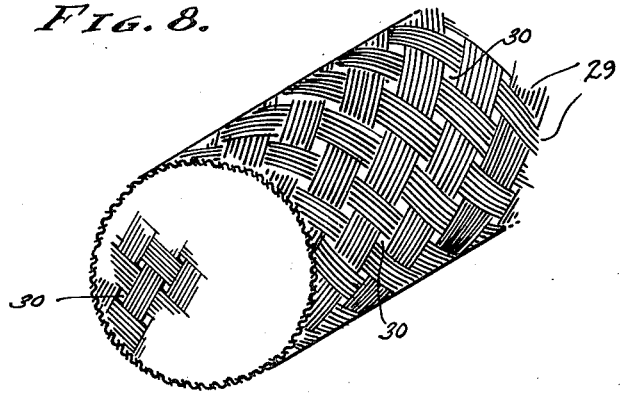
FIG. 8 illustrates a multi-strand mesh or grid in tubular form.

In FIG. 8 the woven mesh is indicated in tubular form as a multi-strand, cross-over weave 29, showing holes or spaces 30; other weaves with or without spaces may be used, as also close or open-weave designs, and which may be selected for efficiency relative to the materials being processed through the mixing apparatus.

*Operation*

The pressure pumps in operation exert pressure upon the materials in the containers 8 and 9, advancing the materials to the inlet ports 10 and 11, and into the upper part of the cylindrical cavity 13. At this point, the diametrically opposed advancing materials are forced by the pressure through the meshes of the tubular mesh section 29A.

As the motor or power source 5 revolves and transmits a reciprocating motion to the end 28 of the actuating rod 24, a pulsating or pumping effect is exerted upon the entering material by the consecutive effect of the tension or elongation at the low end of the stroke, by the release of such tension, at a point of equilibrium at the center or intermediate point of the travel of the stroke, and by a compression of the meshes at the top or high point of the stroke of the tubular section 29A. Simultaneously the lower section 29B of the tubular mesh is subjected to a similar pulsation effect but in directly opposed relationship.

The simultaneous consequence of the alternate tension and compression effect exerted by the opposed pulsations or movements of the tubular mesh sections 29A and 29B is to severely work, shear and mix the compound continuously in and out of the meshes of the tubular sections and direct its travel through the cavity 13 to the outlet point or nozzle 20.

The extruded or discharged material is completely mixed; color or other additives are intimately and evenly distributed throughout the mass, and any thixotropic characteristic present in the entering materials is immediately re-assumed as the material leaves the outlet nozzle.

The speed and length of travel of the reciprocating motion applied to the actuating rod 24, may be adjusted to conform to, or to suit the density, fluidity or other characteristic of the entering materials, by cam contour, spring loading or other means of motive transmission or like mechanical arrangement known in the art. The above described mixing apparatus thoroughly works and mixes viscous liquids or pastes and brings the resultant compound to a homogenous condition ready for packaging, or for immediate application.

A further highly important feature of the invention is that the materials, during passage through the cylindrical channel 13 and the tubular mesh sections 29A and 29B, are severely worked, intensely mixed, sheared, and subjected to much movement during the mixing operation. The mixed compound, however, reaches the delivery outlet 12 without developing heat, this important fact enabling hitherto highly thermal reactive materials to be mixed without the danger of exotherm and premature setting.

Established trade procedures may be used to proportionally meter or otherwise control the flow of the unmixed materials to the inlet parts 10 and 11, whereby catalysts, colorants, plasticising agents, or other additives can be incorporated. Types of materials suitable for processing through the mixing apparatus include liquids or solutions, as glycerol, thiokol, fruit and vegetable juices, molasses, oils, synthetic resin liquids of the urea or melamine formaldehyde type polyester resins, epoxy liquid resins, paints or other heavy viscous solutions or liquids.

Other types of materials that this principle of mixing can efficiently and speedily combine are heavy non-thixotropic or thixotropic materials as putty, clays, porcelain slips, caulking compounds or plastic compositions as epoxy thiokol mixtures, or any group of plastic materials with or without filling agents. Such filling agents, however, must be of relatively fine mesh or particle size able to pass freely through the tubular mesh, such as alumina, talc, rice powder, or the like.

A method of simultaneously mixing and dispensing materials as described in this specification is highly desirable in many fields, whereby delicate compounds or mixtures of an exothermic, or materials requiring a rapid transition period from the unmixed to the mixed state; materials also in which the minimum possible air is incorporated, or material that rapidly oxidizes when unduly exposed to a homogenising or mixing operation.

Present methods of chemical and industrial mixing do, in the main, prolong, expose and heat the product during the mixing operation, and require time and watchful care for thorough mixing; and these factors preclude or render difficult and costly the mixing of many types of materials.

It is to be understood that the above described arrangement, operation, and scope, are simply illustrative of the principles of my invention. Numerous other arrangements, particularly of the cylinder, bore, the type and design of the woven tubular mesh and method of transmitting motion, may be devised by those skilled in the art, which will embody the principles of the invention and fall within the spirit and scope thereof.

A practical and important feature of the invention is the ease and speed with which the mixing element, compressing the tubular sections 29A and 29B, attached to the actuating rod 24, may be detached from the apparatus, and cleaned or replaced by a new element, without the necessity of cleaning a complete machine as is required of most present mixing apparatus.

The cylindrical body enclosing the tubular element may be, in order to facilitate tear down or replacement, constructed of snap-on devices, of which many adaptable examples are on the market.

It is not intended to limit the invention to the particular configuration of the cylinder as described herein, nor is the invention intended to be limited to the particular woven design of the mesh comprising the tubular mixing element, since this may be of any design commensurate with the purpose intended. A fine screen will given an homogenising effect and the coarser screen will give a mixing effect, according to the degree of open mesh. Also, the invention is not limited to the materials, from which the mesh may be constructed, since these may be of metal, plastic, or fabric, and adapted to suit the compounds being homogenised or mixed; for example, an apparatus completely built throughout of plastic material may be desired for compounds or material allergic to metal contamination.

*Principle*

Direct computation of the mixing or shearing forces developed in the pressured materials, when mixed or homogenised within the confines of the cylinder 13 and within and through the multifold meshes of the tubular sections 29A and 29B is complicated and difficult to define within the scope of the present known principles of this invention.

In a further explanatory definition the present invention provides a woven mesh tubular body, divided into two sections 29A and 29B; one section 29A is closed and rigidly held at one end within the cylinder 13, the other end also rigidly clamped or held upon one end of an actuating rod 24. The other section of the tubular mesh 29B is also held at the junction of the section 29A upon the actuating rod 24, the other end of section 29B is slidably attached to the actuating rod while being rigidly held at the end of the cylinder 13. The element of the centrally constricted tubular mesh is now confined and retained at both ends within a cylindrical cavity 13, while the actuating rod attached to the center of the division of the tubular mesh is free to slide within the lower end of the tubular mesh section 29B.

Reciprocating motion is imparted to the actuating rod 24 at the free end 28 of the rod. The reciprocating motion in completing a full cycle provides three main points of movement to the actuating rod 24:

(1) Down stroke, or maximum extent of the stroke.
(2) Intermediate point, or center point of the stroke.
(3) The up, or minimum extent of the stroke.

The effect upon the attached sections 29A and 29B of the tubular mesh, rigidly held at both ends within the cylindrical cavity 13, with the center of the tubular mesh rigidly held upon the actuating rod 24, and the other end of the tubular mesh 29B also rigidly held at the end of the cylindrical cavity while permitting the actuating rod to freely move within the tubular section 29B, is a series of alternating extensive and compressive intricate movements upon the multi-strands of warp and weft of the mesh design of the tubular mesh element. These spring-like movements are further amplified by the alternate extension and compression of the tubular mesh sections 26A and 26B.

The summation of the total intricate movements occurring within the cylinder, further amplified by the opposing pressures upon the material at the inlets 10 and 11, and still further augmented by the downward travel of the material through the cylinder, provides a multiplicity of fine shear and mixing movements, forming the basic feature of this invention.

The mixing operation occurs with a constant velocity, the mixed material issuing at a uniform rate.

Diminution of pressure causes a corresponding diminution of egress.

Within the cylinder, the complexity of tangential forces operating upon the material produces a further complexity of movement with the mass, and micro-local differences of individual particle velocity. The multiplicity of minute shearing stresses involve, the breakdown of cohesion between particles, the continuous displacement and turbulence imparted to the materials during passage from inlets to outlet all combine to provide a fine homogeneous intensely mixed compound occurring within seconds upon starting the mixing apparatus.

While I have shown a particular embodiment and arrangement of my invention, it will be understood, of course, that I do not wish to be limited thereto, since many modifications may be made, and I therefore contemplate by the appended claims to cover any such modifications as fall within the spirit and scope of my invention.

Having thus described my invention, what I claim and desire to secure by Letters Patent is:

1. A mixing apparatus comprising in combination pressure pumps, means of connecting said pumps to provide pressure upon individual materials of paste consistency to be mixed, means for conducting said paste materials to a cylinder, a multi-ply mesh tubular element centrally disposed within, and rigidly held at each end of the cylinder, said tubular mesh element constricted at its center to provide two sections, an actuating rod centrally disposed within and rigidly held at one end at the point of juncture of the tubular mesh sections, said actuating rod extending beyond the cylinder while slidably retained at that end within the tubular mesh section, means to impart a reciprocating motion to the actuating rod, and means for dispensing the thoroughly mixed materials simultaneously with the mixing operation.

2. A mixing apparatus comprising in combination pressure pumps, means for connecting said pumps to provide pressure upon individual materials of paste consistency to be mixed, means for conducting said paste materials to the inlet ports of a cylinder, for the purpose of useful work therein, a multi-ply woven mesh element in tubular form centrally disposed within and rigidly held at each end of the cylinder, said tubular mesh element constricted at its center to provide two sections, in one section only is centrally disposed an actuating rod rigidly secured at the constricted center of the two sections, said actuating rod extending beyond the cylinder while being slidably retained at that end within the said tubular mesh section, to impart a reciprocating motion to the actuating rod, at the end protruding, said action causing movement of the mesh of the tubular mesh sections.

3. An apparatus according to claim 2 to carry out the process for the continuous production of mixed materials of paste consistency, wherein there is outlet means for conducting said paste materials from the cylinder, and wherein the tubular element is constructed of woven multi-strand filaments forming a grid or network of interstices, each of size according to the design and size of the filaments forming the woven mesh; larger apertures of desired size being interposed within the design according to the design of the mesh, the whole forming a multiplicity of minute shearing operations upon the paste materials forced under pressure therethrough when said element forms part of a mixing apparatus.

4. A mixing apparatus comprising in combination pressure pumps, means for connecting said pumps to provide pressure upon individual materials to be mixed, means for conducting said materials to the inlet ports of a cylinder, a multi-ply woven mesh element in tubular form constructed of woven multi-strand filaments forming a grid or network of interstices, each of size according to the design and size of the filaments forming the woven mesh, said tubular mesh element being constricted to form two sections; one end of each section being rigidly affixed to each end of the cylinder, the constricted central portion of the tubular mesh being rigidly affixed to one end of an actuating rod member, said rod member being centrally contained within the one section of the tubular mesh and protruding therefrom, said end of the tubular mesh section being slidably retained upon the rod member, the complete element forming a part of a mixing apparatus as described.

5. Apparatus for mixing, advancing, and dispensing paste materials, which comprises a cylinder with a formed cylindrical bore extending longitudinally therethrough, said cylinder containing a tubular mesh element constricted at its center and rigidly affixed to both ends of the cylinder, an actuating rod rigidly affixed within one section of the tubular mesh and rigidly affixed to the junction of the two sections, the rod extending longitudinally and protruding through the one section of the tubular mesh end and slidably contained therein; means for actuating said rod to provide movement to the tubular mesh, being operable up and down with respect to the mid-junction of the tubular mesh element, whereby on the up stroke of the rod there is an elongation or tension of the meshes of the upper section of the tubular mesh element and a compression of the meshes of the lower section of the tubular mesh element, when forming part of a mixing apparatus as described.

6. Apparatus for mixing, advancing and dispensing paste materials, which comprises a cylinder with a formed cylindrical bore extending longitudinally therethrough, said cylinder containing a tubular mesh element constricted at its center and rigidly affixed to both ends of the cylinder, an actuating rod rigidly affixed within one section of the tubular mesh and rigidly affixed to the junction of the two sections, the rod extending longitudinally and protruding through the one section of the tubular mesh end and slidably contained therein, means for actuating said rod to provide movement to the tubular mesh, being operable up and down with respect to the mid-junction of the tubular mesh element, whereby on the center of the stroke both sections of the tubular mesh are in equilibrium, when forming part of a mixing apparatus as described.

7. Apparatus for mixing, advancing and dispensing paste materials, which comprises a cylinder with a formed cylindrical bore extending longitudinally therethrough, said cylinder containing a tubular mesh element constricted at its center and rigidly affixed to both ends of the cylinder, an actuating rod rigidly affixed within one section of the tubular mesh and rigidly affixed to the junction of the two sections, the rod extending longitudinally and protruding through the one section of the tubular mesh end and slidably contained therein, means for actuating said rod to provide movement to the tubular mesh, being operable up and down with respect to the mid-junction of the tubular mesh element, whereby on the downward or lower part of the stroke of the actuating rod there is a compression of the meshes of the upper section of the tubular mesh element and an extension of the meshes of the lower section of the tubular mesh element, when forming part of a mixing apparatus as described.

8. A machine to carry out the process for the continuous production of mixed compounds from two or more materials of paste consistency, pressurizing and conveying said paste materials through the inlet ports of a cylinder, said cylinder containing, and centrally located therein and rigidly held at both ends, an element of woven multi-strand mesh in tubular form, said tubular mesh element divided into two sections, one section containing an actuating rod centrally contained therein and one end of said rod rigidly held at the junction of the two tubular mesh sections, the free end of the actuating rod slidably protruding from the other end of the tubular mesh section and the containing cylinder, reciprocating means operatively associated with the free end of the actuating rod, being operable up and down with respect to the mid-junction of the tubular mesh element, said operation causing an elongation or tension of the meshes of the upper section of the tubular mesh element and a compression of the meshes of the lower section of said element on the downward stroke of the actuating rod, said operation in its continuance causing a settlement or state of equilibrium of both sections of the tubular mesh at the mid-point of the up and down stroke of the actuating rod, said operation in continuance of its cycle to the upward stroke causing an effect opposite to that of the downward stroke whereby the upper section of the tubular mesh element is subjected to compression and the lower section is elongated, the constant cycle of operation causing a multiplicity of minute shearing actions upon minute quantities of the materials continually entering the exiting under pressure between the multi-strand meshes of the sections of the tubular mesh elements, means of outlet provided from the cylinder for passage of the mixed materials, during the process of rapidly mixing in a continuous manner without incorporating excess air, or frictional heat.

References Cited by the Examiner
UNITED STATES PATENTS

| | | | |
|---|---|---|---|
| 2,654,482 | 10/53 | Robinson | 210—356 |
| 3,100,190 | 8/63 | Hobson | 210—356 |

WALTER A. SCHELL, *Primary Examiner.*

CHARLES A. WILLMUTH, *Examiner.*